United States Patent
Cheng

(10) Patent No.: US 10,085,592 B1
(45) Date of Patent: Oct. 2, 2018

(54) SEQUENTIAL BROILING

(71) Applicant: Brava Home, Inc., Redwood City, CA (US)

(72) Inventor: Shih-yu Cheng, Union City, CA (US)

(73) Assignee: BRAVA HOME, INC., Redwood City, CA (US)

( * ) Notice: Subject to any disclaimer, the term of this patent is extended or adjusted under 35 U.S.C. 154(b) by 1 day.

(21) Appl. No.: 15/659,543

(22) Filed: Jul. 25, 2017

Related U.S. Application Data

(63) Continuation-in-part of application No. 15/261,784, filed on Sep. 9, 2016.

(60) Provisional application No. 62/370,076, filed on Aug. 2, 2016, provisional application No. 62/256,626, filed on Nov. 17, 2015, provisional application No. (Continued)

(51) Int. Cl.
| | |
|---|---|
| *A21B 1/22* | (2006.01) |
| *A47J 37/06* | (2006.01) |
| *H05B 6/12* | (2006.01) |
| *F24C 7/06* | (2006.01) |

(52) U.S. Cl.
CPC .............. *A47J 37/0676* (2013.01); *F24C 7/06* (2013.01); *H05B 6/1236* (2013.01)

(58) Field of Classification Search
CPC .... H05B 3/0076; H05B 3/0071; H05B 3/742; H05B 3/744; H05B 6/6441; H05B 6/6447; H05B 6/6482; H05B 6/6494; F24C 7/04; F24C 7/043; F24C 7/085; F24C 7/087; F24C 7/06; F24C 7/062; F24C 7/065; F24C 7/08; F24C 7/046; F24C 15/16; F24C 15/166; F24C 15/22; H04N 5/33; H04N 5/332; H04N 5/335; H04N 5/247; H04N 7/181; H04N 7/183; H04W 88/06
See application file for complete search history.

(56) References Cited

U.S. PATENT DOCUMENTS

| | | |
|---|---|---|
| 4,475,024 A | 10/1984 | Tateda et al. |
| 7,075,442 B2 | 7/2006 | Lion et al. |

(Continued)

FOREIGN PATENT DOCUMENTS

| | | |
|---|---|---|
| CN | 101398197 A | 4/2009 |
| RU | 2006102663 A | 8/2007 |

(Continued)

OTHER PUBLICATIONS

International Search Report and Written Opinion for International Application No. PCT/US2016/051142 dated Jan. 12, 2017, 5 pages.

(Continued)

*Primary Examiner* — Shawntina Fuqua
(74) *Attorney, Agent, or Firm* — Haynes and Boone, LLP

(57) ABSTRACT

Several embodiments include a cooking appliance/instrument (e.g., oven). The cooking instrument can draw an alternating current (AC) power and generate a maximum available power for a heating system of the cooking instrument via a power component that converts the drawn AC power. The cooking instrument can then directionally heat each of different zones in a cooking chamber of the cooking instrument in sequence using one or more heating elements of the heating system on at least one side of the cooking chamber such that each step in the sequence utilizes the maximum available power for the heating system.

23 Claims, 11 Drawing Sheets

Related U.S. Application Data

62/249,456, filed on Nov. 2, 2015, provisional application No. 62/240,794, filed on Oct. 13, 2015, provisional application No. 62/218,942, filed on Sep. 15, 2015, provisional application No. 62/216,859, filed on Sep. 10, 2015.

(56) References Cited

U.S. PATENT DOCUMENTS

| | | |
|---|---|---|
| 7,323,663 B2 | 1/2008 | Cavada et al. |
| 7,619,186 B2 | 11/2009 | Cavada et al. |
| 7,683,292 B2 | 3/2010 | Cavada et al. |
| 8,791,398 B2 | 7/2014 | De la Cuerda Ortin et al. |
| 8,929,724 B1 * | 1/2015 | Mograbi ................ A21B 2/00 219/405 |
| 9,414,444 B2 | 8/2016 | Libman et al. |
| 2008/0259995 A1 | 10/2008 | Kuhn et al. |
| 2009/0272814 A1 | 11/2009 | Granhed et al. |
| 2010/0199857 A1 | 8/2010 | Storiz et al. |
| 2012/0180775 A1 | 7/2012 | Waltz et al. |
| 2017/0074522 A1 | 3/2017 | Cheng et al. |

FOREIGN PATENT DOCUMENTS

| | | | |
|---|---|---|---|
| RU | 2007111953 A | 10/2008 | |
| RU | 2008111110 A | 9/2009 | |
| RU | 110892 U1 | 11/2011 | |
| WO | 9830941 A1 | 7/1998 | |

OTHER PUBLICATIONS

Non-Final Office Action dated Aug. 9, 2017, for U.S. Appl. No. 15/490,768 of Cheng et al. filed Apr. 18, 2017, 6 pages.

\* cited by examiner

SEQUENTIAL BROILING

CROSS-REFERENCE TO RELATED APPLICATIONS

This application claims the benefit of U.S. Provisional Patent Application No. 62/370,076, filed Aug. 2, 2016, and is a continuation-in-part of U.S. patent application Ser. No. 15/261,784, filed Sep. 9, 2016, which claims the benefit of U.S. Provisional Patent Application No. 62/256,626, filed Nov. 17, 2015; U.S. Provisional Patent Application 62/249,456, filed Nov. 2, 2015; U.S. Provisional Patent Application No. 62/240,794, filed Oct. 13, 2015; U.S. Provisional Patent Application No. 62/218,942, filed Sep. 15, 2015, and U.S. Provisional Patent Application No. 62/216,859, filed Sep. 10, 2015, which all are incorporated by reference herein in their entirety.

TECHNICAL FIELD

Various embodiments relate to cooking instruments, such as ovens.

BACKGROUND

The art of cooking remains an "art" at least partially because of the food industry's inability to help cooks to produce systematically award worthy dishes. To make a full course meal, a cook often has to use multiple cooking instruments, understand the heating patterns of the cooking instruments, and make dynamic decisions throughout the entire cooking process based on the cook's observation of the target food's progression (e.g., transformation due to cooking/heating). Because of this, while some low-end meals can be microwaved (e.g., microwavable meals) or quickly produced (e.g., instant noodles), traditionally, truly complex meals (e.g., steak, kebabs, sophisticated dessert, etc.) cannot be produced systematically using conventional cooking instruments automatically. The industry has yet been able to create an intelligent cooking instrument capable of automatically and consistently producing complex meals with precision, speed, and lack of unnecessary human intervention.

Figure 1:
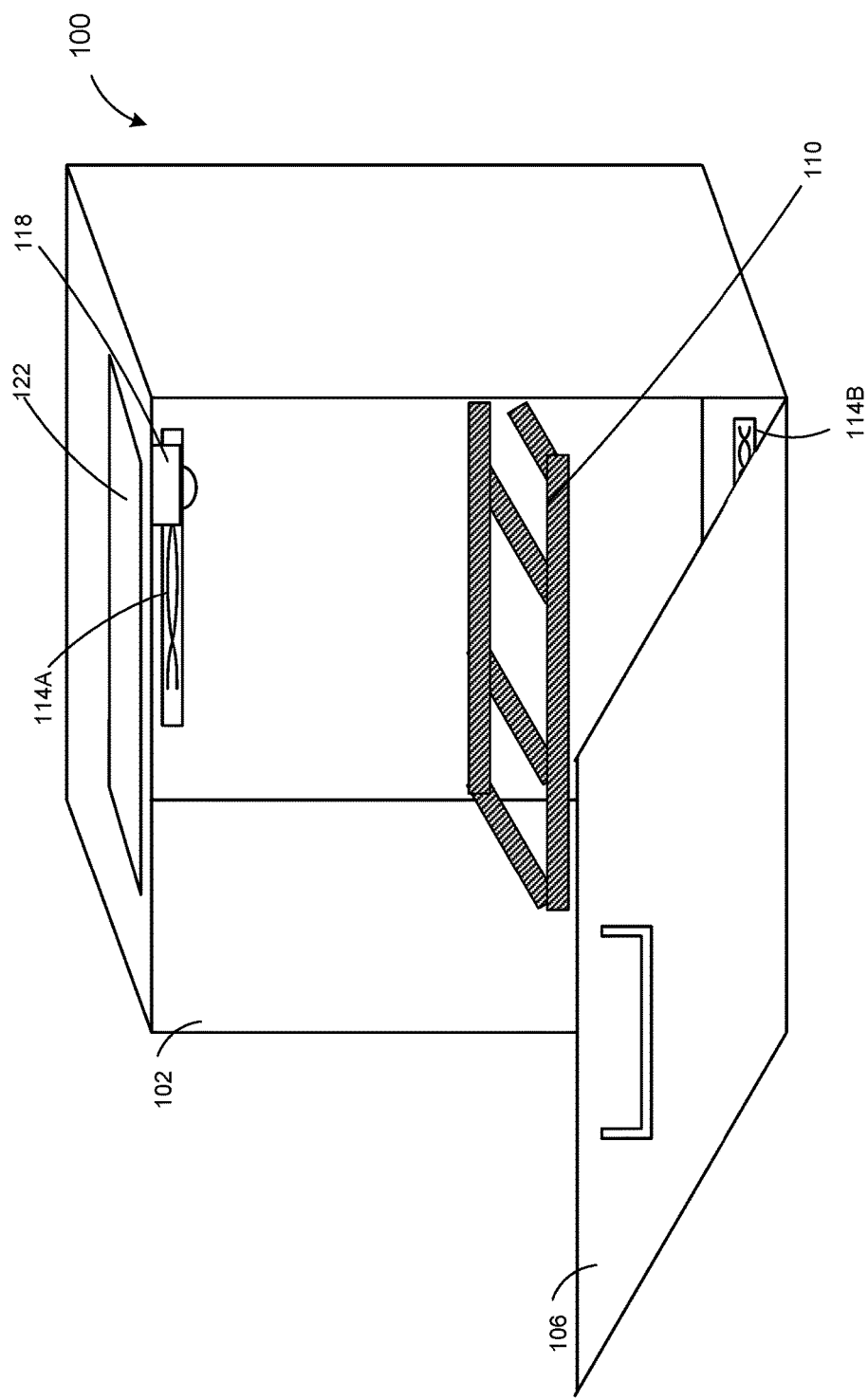
FIG. 1 is a structural diagram of a perspective view of a cooking instrument, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Conventional cooking instruments, such as a convection oven, aims to cook food evenly. These conventional cooking instruments achieve even cooking by avoiding directional heating. As a result, the exterior surface of a target food substance would be cooked evenly by heating elements of a conventional cooking instrument. However, omnidirectional heating requires a higher power consumption compared to directional heating. Hence, the speed in which a conventional cooking instrument can cook food is often capped by how much power the conventional instrument can draw from a household outlet without triggering the circuit breaker.

In several embodiments, a cooking instrument is configured to sequentially focus its total available power of its heating system ("total transferable power") toward respective subsections of the exterior surface of the target food substance. For clarity, the respective subsections do not necessarily have to be adjacent to each other.

Several embodiments include a cooking instrument/appliance (e.g., the cooking instrument 100). The cooking instrument can include: a cooking chamber (e.g., the chamber 102); a power component (e.g., relay, an inverter, a converter, or any combination thereof, such as the power source 202); a heating system (e.g., the heating elements 114); and a control system (e.g., the computing device 206). The power component can be adapted to draw from an alternating current (AC) power source (e.g., alternating current power line 710) substantially at a maximum limit of the power source and convert and/or provide the drawn AC power to a maximum transferable power to an infrared-based heating system. The power component can be a variable DC power component. The power component can be a relay that provides the external AC power directly to the heating elements of the heating system. The power component can be configured to supply power at a predefined power level that is a maximum amount capable of being drawn from a power source without triggering a circuit breaker of the power source. In some examples, the maximum transferable power is the drawn AC power reduced by power conversion/relay inefficiency and the power draw of other components of the cooking instrument during each step of a heating sequence.

The heating system can emit wireless waves that directly transfer heat to food. These wireless waves can include waves with peak wavelengths in the infrared spectrum. In these examples, the heating system can be referred to as the "infrared-based heating system. The infrared-based heating system can include: multiple heating elements on a side of the cooking chamber; and one or more heat element drivers (e.g., filament drivers 224) for the multiple heating elements. In some embodiments, each of the one or more heat element drivers corresponds to a single one of the multiple heating elements. In some embodiments, each of the one or more heat element drivers corresponds to more than one of the multiple heating elements.

The control system is configured to drive subsets of the multiple heating elements in sequence. In each step of the sequence, the control system is configured to drive each subset utilizing the maximum transferable power. In one example, the maximum limit is 1500 W of continuous draw and 1800 W of temporary draw. In some cases, each of the subsets is a single heating element. In other cases, each subset includes more than one heating element. In some examples, the subsets have at least one different heating element from one another.

In some examples, the power component has the hardware capability of drawing power that is more than the maximum limit from the AC power source but for that it is configured with a feedback loop to prevent drawing more than the maximum limit. In some embodiments, the power component and the heating elements, when subjected to a compliant AC power source, would stabilize at the maximum transferable power because it would have single impedance/resistance level and characteristic power load that prevent further power draw. The power component can be referred to as a power supply.

The control system is configured to utilize a feedback control loop to achieve even heating of at least one side of food in the cooking chamber after completion of the sequence. In some embodiments, the control system is configured to dynamically adjust duration and/or intensity of a step or heating intensity of a subset of the heating elements in the sequence based on a sensor input. For example, the control system can be configured to monitor power consumption of the heating system as an input to the feedback control loop. For example, the control system can ensure that power consumption of each subset of the heating elements is substantially equal amongst steps in the sequence. The control system can configure the sequence to prevent no more power draw than the maximum transferable power. In some embodiments, the cooking instrument includes an image sensor. In those embodiments, the control system is configured to analyze an image from the image sensor to produce an input to the feedback control loop such that the control system ensures to continue heating with each subset of the heating elements until the target food is visually equivalent in browning level as the food targeted by another subset. In some embodiments, the cooking instrument includes one or more temperature sensors configured to monitor temperature of the food respectively targeted by the subsets. In those embodiments, the control system is configured to compare the temperature of the targeted food against a preset temperature and utilize the detected temperature as an input to the feedback control loop such that the control system ensures to continue heating with each subset of the heating elements until the target food is reaches the predetermined temperature.

In some embodiments, the control system is configured to reduce said heating between sequential steps in the sequence for a predetermined constant duration.

Several embodiments include a cooking instrument comprising: a heating system with multiple heating elements; at least one heating element driver; a power component capable of providing power (e.g., variable power) to a heating system up to a maximum limit; and a controller configured to select a heating sequence to operate the heating system. The at least one heating element driver is configured to be able to, at a given step of the heating sequence, divert the provided power at the maximum limit (e.g., equally or unequally) to the heating elements or to converge the provided power at the maximum limit to only a subset of the multiple heating elements.

The cooking instrument can include an input interface (e.g., the input component 234). The cooking instrument can also include a cooking chamber. The at least one heating element driver is configured by the controller to heat, according to a digital recipe received via the input interface, food in the cooking chamber. The input interface can be a user interface (e.g., one or more buttons, a touch screen, a microphone, or any combination thereof) or a wireless communication interface that communicates with another device.

FIG. 1 is a structural diagram of a perspective view of a cooking instrument 100, in accordance with various embodiments. The cooking instrument 100 can include a chamber 102 having a door 106. At least one cooking platform 110 is disposed inside the chamber 102. The cooking platform 110 can be a tray, a rack, or any combination thereof. The chamber 102 can be lined with one or more heating elements 114 (e.g., a heating element 114A, a heating element 114B, etc., collectively as the "heating elements 114"). Each of heating elements 114 can include a wavelength controllable filament assembly. The wavelength controllable filament assembly is capable of independently adjusting an emission frequency/wavelength, emission power, and/or emission signal pattern in response to a command from a computing device (not shown) of the cooking instrument 100.

In several embodiments, the chamber 102 is windowless. That is, the chamber 102, including the door 106, is entirely enclosed without any transparent (and/or semitransparent) parts when the door 106 is closed. For example, the chamber 102 can be sealed within a metal enclosure (e.g., with thermal insulation from/to the outside of the chamber 102) when the door 106 is closed. A camera 118 can be attached to an interior of the chamber 102. In some embodiments, the camera 118 is attached to the door 106. For example, the camera 118 can face inward toward the interior of the chamber 102 when the door 106 is closed and upward when the door 106 is opened as illustrated. In some embodiments, the camera 118 is installed on the ceiling (e.g., top interior surface) of the chamber 102. The camera 118 can be attached to the door 106 or proximate (e.g., within three inches) to the door 106 on the ceiling of the chamber 102 to enable easy cleaning, convenient scanning of labels, privacy, heat damage avoidance, etc.

In several embodiments, the heating elements 114 include one or more wavelength-controllable filament assemblies at one or more locations in the chamber. In some embodiments, each of the one or more wavelength-controllable filament assemblies is capable of independently adjusting its emission frequency (e.g., peak emission frequency) and/or its emission power. For example, the peak emission frequency of the wavelength-controllable filament assemblies can be tuned within a broad band range (e.g. from 20 terahertz to 300 terahertz). Different frequencies can correspond to different penetration depth for heating the food substances, other items within the chamber 102, and/or parts of the cooking instrument 100.

The heating elements can be controlled to have varying power, either by using a rapidly switching pulse width modulation (PWM)-like electronics by having a relay-like control that turns on and off relatively quickly compared to the thermal inertia of the heating filament itself. The change in peak emission frequency can be directly correlated with the amount of power delivered into the heating element. More power correlates to higher peak emission frequency. In some cases, the cooking instrument 100 can hold the power constant while lowering the peak emission frequency by activating more heating elements, each at a lower power. The cooking instrument 100 can independently control peak emission frequencies of the filament assemblies and power them by driving these filament assemblies individually.

In some embodiments, using the max power for each individual heating element to achieve the highest emission frequency is challenging because the power consumption may be insufficiently supplied by the AC power supply (e.g., because it would trip the fuse). In some embodiments, this is resolved by sequentially driving each individual heating element at maximum power instead of driving them in parallel with reduced power. Intermediate peak emission frequency can be achieved by having a combination of sequential driving and parallel driving.

In some embodiments, the camera 118 includes an infrared sensor to provide thermal images to the computing device as feedback to a heat adjustment algorithm. In some embodiments, the cooking instrument 100 includes multiple cameras. In some embodiments, the camera 118 includes a protective shell. In some embodiments, the heating elements 114 and the camera 118 are disposed in the chamber 102 such that the camera 118 is not directly between any pairing of the heating elements. For example, the heating elements 114 can be disposed along two vertical walls perpendicular to the door 106. The heating elements 114 can be quartz tubes (e.g., with heating filaments therein) that run horizontally on the vertical walls and perpendicular to the door 106.

In some embodiments, a display 122 is attached to the door 106. The display 122 can be a touchscreen display. The display 122 can be attached to an exterior of the chamber 102 on an opposite side of the door 106 from the camera 118. The display 122 can be configured to display a real-time image or a real-time video of the interior of the chamber captured by and/or streamed from the camera 118.

Figure 2:
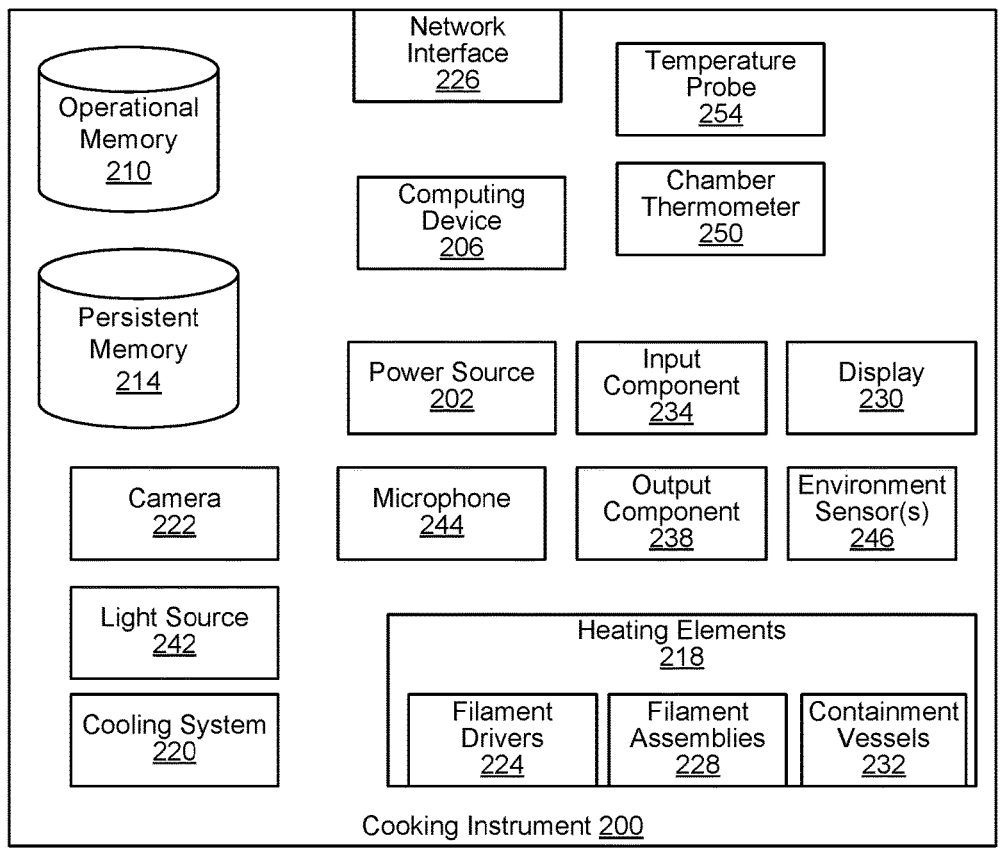
FIG. 2 is a block diagram illustrating physical components of a cooking instrument, in accordance with various embodiments.

FIG. 2 is a block diagram illustrating physical components of a cooking instrument 200 (e.g., the cooking instrument 100), in accordance with various embodiments. The cooking instrument 200 can include a power source 202, a computing device 206, an operational memory 210, a persistent memory 214, one or more heating elements 218 (e.g., the heating elements 114), a cooling system 220, a camera 222 (e.g., the camera 118), a network interface 226, a display 230 (e.g., the display 122), an input component 234, an output component 238, a light source 242, a microphone 244, one or more environment sensors 246, a chamber thermometer 250, a temperature probe 254, or any combination thereof.

The computing device 206, for example, can be a control circuit. The control circuit can be an application-specific integrated circuit or a circuit with a general-purpose processor configured by executable instructions stored in the operational memory 210 and/or the persistent memory 214.

The computing device 106 can control all or at least a subset of the physical components and/or functional components of the cooking instrument 200.

The power source 202 provides the power necessary to operate the physical components of the cooking instrument 200. For example, the power source 202 can convert alternating current (AC) power to direct current (DC) power for the physical components. In some embodiments, the power source 202 can run a first powertrain to the heating elements 218 and a second powertrain to the other components.

The computing device 206 can control peak wavelengths and/or spectral power distributions (e.g., across different wavelengths) of the heating elements 218. The computing device 206 can implement various functional components (e.g., see FIG. 3) to facilitate operations (e.g., automated or semi-automated operations) of the cooking instrument 200. For example, the persistent memory 214 can store one or more cooking recipes, which are sets of operational instructions and schedules to drive the heating elements 218. The operational memory 210 can provide runtime memory to execute the functional components of the computing device 206. In some embodiments, the persistent memory 214 and/or the operational memory 210 can store image files or video files captured by the camera 222.

The heating elements 218 can be wavelength controllable. For example, the heating elements 218 can include quartz tubes, each enclosing one or more heating filaments. In various embodiments, the side of the quartz tubes facing toward the chamber wall instead of the interior of the chamber is coated with a heat resistant coating. However, because the operating temperature of the heating filaments can be extremely high, the cooling system 220 provides convection cooling to prevent the heat resistant coating from melting or vaporizing.

The heating elements 218 can respectively include filament drivers 224, filament assemblies 228, and containment vessels 232. For example, each heating element can include a filament assembly housed by a containment vessel. The filament assembly can be driven by a filament driver. In turn, the filament driver can be controlled by the computing device 206. For example, the computing device 206 can instruct the power source 202 to provide a set amount of DC power to the filament driver. In turn, the computing device 306 can instruct the filament driver to drive the filament assembly to generate electromagnetic waves at a set peak wavelength.

The camera 222 serves various functions in the operation of the cooking instrument 200. For example, the camera 222 and the display 230 together can provide a virtual window to the inside of the chamber despite the cooking instrument 200 being windowless. The camera 222 can serve as a food package label scanner that configures the cooking instrument 200 by recognizing a machine-readable optical label of the food packages. In some embodiments, the camera 222 can enable the computing device 206 to use optical feedback when executing a cooking recipe. In several embodiments, the light source 242 can illuminate the interior of the cooking instrument 200 such that the camera 222 can clearly capture an image of the food substance therein.

The network interface 226 enables the computing device 206 to communicate with external computing devices. For example, the network interface 226 can enable Wi-Fi or Bluetooth. A user device can connect with the computing device 206 directly via the network interface 226 or indirectly via a router or other network devices. The network interface 226 can connect the computing device 206 to an external device with Internet connection, such as a router or a cellular device. In turn, the computing device 206 can have access to a cloud service over the Internet connection. In some embodiments, the network interface 226 can provide cellular access to the Internet.

The display 230, the input component 234, and the output component 238 enable a user to directly interact with the functional components of the computing device 206. For example, the display 230 can present images from the camera 222. The display 230 can also present a control interface implemented by the computing device 206. The input component 234 can be a touch panel overlaid with the display 230 (e.g., collectively as a touchscreen display). In some embodiments, the input component 234 is one or more mechanical buttons. In some embodiments, the output component 238 is the display 230. In some embodiments, the output component 238 is a speaker or one or more external lights.

In some embodiments, the cooking instrument 200 includes the microphone 244, and/or the one or more environment sensors 246. For example, the computing device 206 can utilize the audio signal, similar to images from the camera 222, from the microphone 244 as dynamic feedback to adjust the controls of the heating elements 218 in real-time according to a heat adjustment algorithm. In one example, the audio signal can signify a fire alarm, a smoke alarm, popcorn being popped, or any combination thereof. The environment sensors 246 can include a pressure sensor, a humidity sensor, a smoke sensor, a pollutant sensor, or any combination thereof. The computing device 206 can also utilize the outputs of the environment sensors 246 as dynamic feedback to adjust the controls of the heating elements 218 in real-time according to a heat adjustment algorithm.

In some embodiments, the cooking instrument 200 includes the chamber thermometer 250, and/or the temperature probe 254. For example, the computing device 206 can utilize the temperature readings from the chamber thermometer 250 as dynamic feedback to adjust the controls of the heating elements 218 in real-time according to a heat adjustment algorithm. The temperature probe 254 can be adapted to be inserted into food to be cooked by the cooking instrument 200. The computing device 206 can also utilize the outputs of the temperature probe 254 as dynamic feedback to adjust the controls of the heating elements 218 in real-time according to a heat adjustment algorithm. For example, the heat adjustment algorithm of a cooking recipe can dictate that the food should be heated at a preset temperature for a preset amount time according to the cooking recipe.

Figure 3:
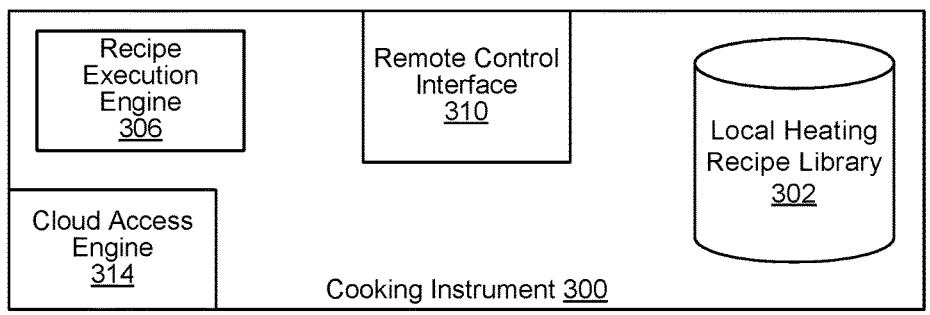
FIG. 3 is a block diagram illustrating functional components of a cooking instrument, in accordance with various embodiments.

FIG. 3 is a block diagram illustrating functional components of a cooking instrument 300 (e.g., the cooking instrument 100 and/or the cooking instrument 200), in accordance with various embodiments. For example, the functional components can run on the computing device 206 or one or more specialized circuits. For example, the cooking instrument 300 can implement at least a cooking recipe library 302, a recipe execution engine 306, a remote control interface 310, a cloud access engine 314, or any combination thereof.

In some embodiments, the recipe execution engine 306 can analyze an image from a camera (e.g., the camera 222) to determine whether a door (e.g., the door 106) is open. For example, the image from the camera may be illuminated by a specific color of a specific light source (e.g., the light source 242) when facing toward an interior of the cooking instrument 300. In some embodiments, the recipe execution engine 306 is configured to analyze an image from the camera to determine whether a machine-readable optical label is within the image. For example, the recipe execution engine 306 can be configured to select a cooking recipe from the cooking recipe library 302 based on the machine-readable optical label. In some embodiments, the remote control interface 310 is configured to send a message to a user device to confirm the automatically selected cooking recipe. In some embodiments, the recipe execution engine 306 is configured to present the cooking recipe for confirmation on a local display and to receive the confirmation a local input component when the cooking recipe is displayed. In response to the selection of the cooking recipe, the recipe execution engine 306 can execute a heating configuration schedule by controlling the heating elements according to the cooking recipe and a heat adjustment algorithm specified therein. The heat adjustment algorithm is capable of dynamically controlling the heating elements 218 (e.g., adjusting output power, spectral power distribution, and/or peak wavelength) in real-time in response to changing input variables.

The remote control interface 310 can be used to interact with a user. For example, a user device (e.g., a computer or a mobile device) can connect to the remote control interface via the network interface 226. Via this connection, the user can configure the cooking instrument 300 in real-time. In one example, the user can select a cooking recipe via a user-device-side application. The user-device-side application can communicate the remote control interface 310 to cause the cooking instrument 300 to execute the selected cooking recipe. The cloud access engine 314 can enable the cooking instrument 300 to access a cloud service to facilitate execution of a cooking recipe or update the cooking recipes in the cooking recipe library 302.

Components (e.g., physical or functional) associated with the cooking instrument can be implemented as devices, modules, circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the functional components). The systems, engines, or devices described herein may include additional, fewer, or different components for various applications.

Figure 4:
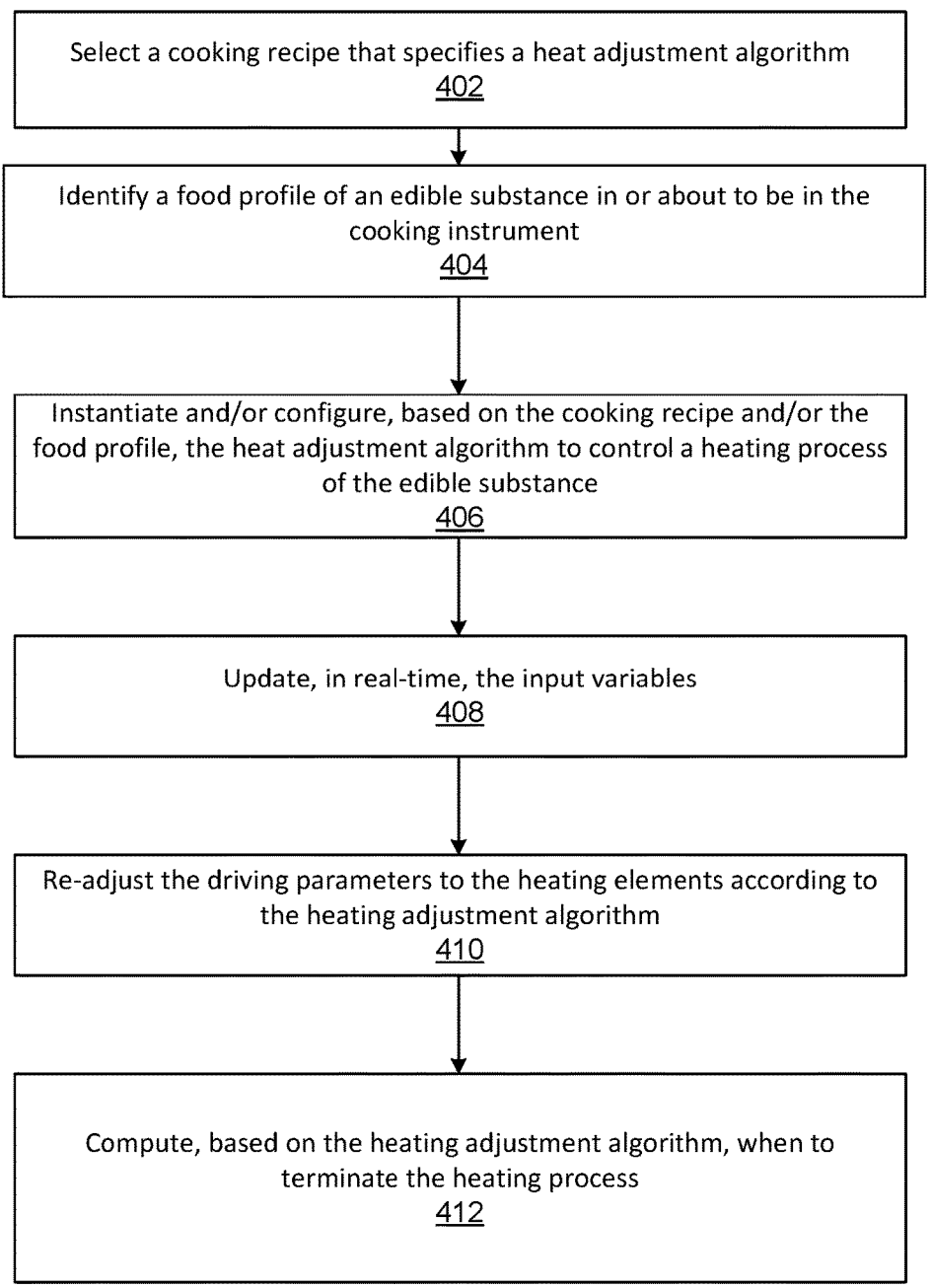
FIG. 4 is a flowchart illustrating a method of operating a cooking instrument to cook food, in accordance with various embodiments.

FIG. 4 is a flowchart illustrating a method 400 of operating the cooking instrument (e.g., the cooking instrument 100, the cooking instrument 200, and/or the cooking instrument 300) to cook a food, in accordance with various embodiments. The method 400 can be controlled by a computing device (e.g., the computing device 206).

At step 402, the computing device can select a cooking recipe (e.g., from a local cooking recipe library stored in the local memory (e.g., the operational memory 210 and/or the persistent memory 214) of the computing device and/or the cooking instrument, a heating library implemented by a cloud service accessible through a network interface (e.g., the network interface 226), or another external source connected to the computing device). Optionally, at step 404, the computing device can identify a food profile of an food in or about to be in the cooking instrument. For example, the computing device can utilize a camera to identify the food profile (e.g., performing image recognition of the food or scanning a digital label attached to an outer package of the food). The food profile can identify the size of the food, the weight of the food, the shape of the food, the current temperature of the food, or any combination thereof.

At step 406, the computing device can instantiate and/or configure, based on the cooking recipe and/or the food profile, a heat adjustment algorithm to control a heating process of the food. The heat adjustment algorithm specifies how to adjust the driving parameters of one or more heating elements in the cooking instrument based on input variables that may change over time. Input variables can include time lapsed (e.g., from when the heating elements are first driven and/or when the heating process first begins), temperature (e.g., detected by a temperature sensor therein) within the cooking instrument, user input (e.g., via an external device connected to the computing device or a control panel of the cooking instrument), temperature within the food (e.g., as reported by a temperature probe inserted into the food and communicatively coupled to the computing device), real-time or asynchronous image analysis of the food, real-time or asynchronous audio signal analysis from a microphone inside or outside of the cooking instrument, real-time or asynchronous environment sensor output analysis, other data received over a network, other data generated by a component of the cooking instrument, or any combination thereof. At step 408, the computing device can update, in real-time, the input variables and, at step 410, re-adjust the driving parameters to the heating elements according to the heating adjustment algorithm.

Part of the adjustment made by the heat adjustment algorithm can include heat intensity, peak wavelength (e.g., for targeting different food or material within the cooking chamber), heat duration, topical heat location (e.g., zones), or any combination thereof. The computing device can configured the heating elements to apply different heating patterns to different zones on a tray in the cooking instrument. The different zones can be portions of the tray or regions of food resting on the tray. The computing device can configure the heating elements to apply, simultaneously or sequentially, different heating patterns (e.g., heating levels) to different zones (e.g., areas above the tray) on the support tray by supplying different amount of power to different heating elements. The computing device can configure the heating elements to apply different heating patterns to different zones on the support tray by driving the heating elements of the heating system at varying peak wavelengths. The cooking instrument can include a perforated metallic sheet between the tray and at least one of the heating elements. The computing device can configure the heating elements to apply different heating patterns to different zones on the support tray by using the perforated metallic sheet to spatially block portions of waves emitted by the at least one of the heating elements.

At step 412, the computing device can compute, based on the heating adjustment algorithm, when to terminate the heating process (e.g., when the cooking instrument stops supplying power to the heating elements). In some embodiments, the heating adjustment algorithm takes into account whether the food is expected to be extracted out of the cooking instrument substantially immediately after the termination of the heating process (e.g., a high-speed mode). For example, the heating adjustment algorithm can shorten the expected termination time if the user indicates that the food will remain in the cooking instrument a preset duration after the termination of the heating process (e.g., a low stress mode).

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 5A:
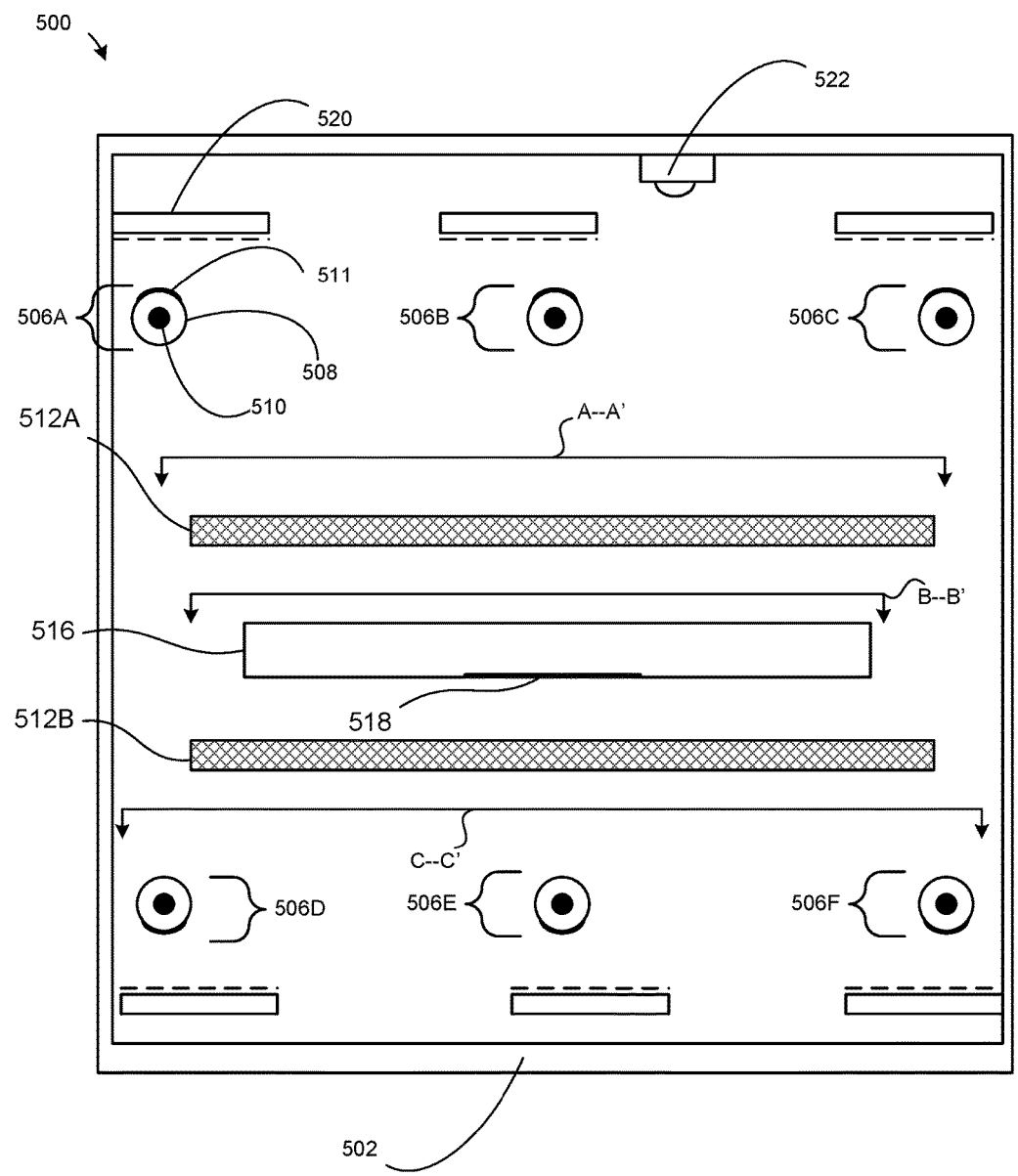
FIG. 5A is a cross-sectional front view of a first example of a cooking instrument, in accordance with various embodiments.

FIG. 5A is a cross-sectional front view of a first example of a cooking instrument 500 (e.g., the cooking instrument 100, the cooking instrument 200, and/or the cooking instrument 300), in accordance with various embodiments. The cooking instrument 500 includes a chamber 502 and one or more filament assemblies 506 (e.g., a filament assembly 506A, a filament assembly 506B, a filament assembly 506C, a filament assembly 506D, a filament assembly 506E, a filament assembly 506F, etc., collectively as the "filament assemblies 506") at one or more locations in the chamber 502. The filament assemblies 506 can be part of the heating elements of the cooking instrument 500. Each of the filament assemblies 506 can include a containment vessel 508 surrounding a filament 510. The containment vessel 508 can be coated with reflective material to serve as a reflector 511. This way, the reflector 511 is prevented from being fouled by debris. The containment vessel 508 can be made of quartz. The reflective material can be gold or white ceramics, such as zirconium oxide, silicon oxide, etc. The filament assemblies 506 can be tungsten halogen assemblies. The reflective material can be coated on a portion of an outer surface of each heating element that faces away from a tray 516. In some embodiments, the reflector 511 is a separate component than each of the filament assemblies 506 and the containment vessel 508. For example, each of the reflector 511 can be positioned adjacent to each of the filament assemblies 506 away from the center of the cooking chamber. In some embodiments, the reflector 511 is placed close enough to each of the filament assemblies 506 such that during normal operations (e.g., approximately 450 Fahrenheit or above), debris is burnt off between the reflector 511 and the filament assembly. In some embodiments, at least one of the filament assemblies 506 is between the reflector 511 and a glass covering. In some embodiments, a glass covering is between at least one of the filament assemblies 506 and the reflector 511.

A computing device (e.g., the computing device 206) can be configured to control the peak emission wavelengths of the filament assemblies 506. For example, the computing device can be configured to identify a food profile associated with food (e.g., in the chamber 502) based on sensor input (e.g., camera scanning a label) or the user input. The computing device can then determine one or more excitable wavelengths associated with the food profile. The computing device can drive the filament assemblies 506 to emit at a peak emission wavelength corresponding to at least one of the excitable wavelengths to heat the food.

In some embodiments, the chamber 502 is entirely enclosed in metal. In some embodiments, the chamber 502 has the door. In some embodiments, the chamber 502 has one or more transparent windows (e.g., glass windows). In some embodiments, one or more perforated metal sheets 512 (e.g., a perforated metal sheet 512A and/or a perforated metal sheet 512B, collectively as the "perforated metal sheets 512") are disposed within the chamber 502. In some embodiments, there is only a single perforated metal sheet in the chamber 502 (e.g., above the tray 516 or below the tray 516). In some embodiments, there are two perforated metal sheets (as shown). Each of the perforated metal sheets 512 can be a removable or fixated panel. The perforated metal sheets 512 can enable control of heating concentration along a horizontal plane parallel its surface. Perforated metal sheets, such as a perforated aluminum foil, can be used to shield certain food items from the intense radiant heat generated by the heating elements. For example, when cooking a steak and vegetables side-by-side, the perforated metal sheets can shield the vegetables from being overcooked and enable the steak to receive the full power from the heating elements. Longer wavelength emission from the filament assemblies 506 can penetrate perforations more equally compared to shorter wavelength. Hence even if the perforations were designed to shield, for example, 90% of direct radiant heat, the cooking instrument can still independently tune the heating by varying the wavelength. This enables some control of side-by-side cooking in addition to direct radiant heating.

In some embodiments, the chamber 502 includes the tray 516 (e.g., the cooking platform 110) in the chamber 502. In some embodiments, the tray 516 includes or is part of at least one of the one or more perforated metal sheets 512. The computing device can be configured to drive the heating elements to emit at a peak emission wavelength corresponding to excitable wavelength for the tray 516. By tuning the peak emission wavelength to the excitable wavelength of the tray 516, the computing device can heat up the tray 516 without directly heating the air or the food inside the chamber 502.

The tray 516 can be made of glass. The tray 516 can include an optically transparent region enabling visible light to substantially travel through two opposing surfaces of the tray 516. For example, a user of the cooking instrument 500 can place an instruction sheet beneath the tray 516 while arranging food on the tray 516 to be cooked. The user can directly overlay specific food at the desired location according to the instruction sheet. The tray 516 can include a reflective portion 518 to enable a top side camera 522 to capture a bottom view of food resting on the tray 516.

The cooking instrument 500 can include an airflow-based cooling system 520. The airflow-based cooling system 520 can blow directly onto a reflector portion of the containment vessel 508 to cool (e.g., prevent vaporization of the reflective coating) and improve performance of the reflector 511. The airflow can be controlled to provide impingement convection heating. The airflow-based cooling system 520 can have an air path that filters steam and thus prevents hot air from escaping when the door of the cooking instrument 500 is opened. The air path can also be configured to go over a camera (not shown) of the cooking instrument 500 to keep the lens of the camera condensation free.

In some embodiments, a fan can be installed away from the filament assemblies 506. When the peak wavelength of a filament assembly is configured to heat the envelope and/or the containment vessel 508, the fan can stir the air within the chamber 502 to ensure that heated air adjacent to the containment vessels 508 is moved to other parts of the chamber 502 to cook the food.

In some embodiments, the cooking instrument 500 lacks a crumb tray. For example, the cooking instrument 500 can use quartz or other heat resistant sheet to cover the heating elements so that the bottom of the cooking instrument chamber has no heating elements to trip over. The heat resistant sheet can be transparent at the operating wavelengths of the filament assemblies 506 to enable for the emission from the heating elements to penetrate through without much loss.

In some embodiments, the computing device within the cooking instrument 500 can drive the filament assemblies 506 according to instructions in a cooking recipe. For example, the computing device can drive at least one of the filament assemblies 506 at a specific peak wavelength. The specific peak wavelength can correspond to excitable wavelengths of the materials in the support tray, the containment vessel 508 (e.g., envelope of the filament assembly), a specific type of edible material, water molecules, or any combination thereof. By matching the specific peak wavelength, the computing device can target specific material for heating. For example, the computing device can drive at least one of the heating elements at a peak wavelength (e.g., 3 µm or above for glass trays) such that the support tray is substantially opaque to waves emitted from the at least one of the heating elements. The computing device can drive at least one of the heating elements at a peak wavelength (e.g., 3 µm or less for glass trays) such that the support tray is substantially transparent to waves emitted from the at least one of the heating elements. The computing device can drive at least one of the heating elements at a peak wavelength (e.g., between 3 µm and 4 µm for glass trays) such that the support tray is heated by waves emitted from the at least one of the heating elements without heating any organic food in the cooking chamber.

Figure 5B:
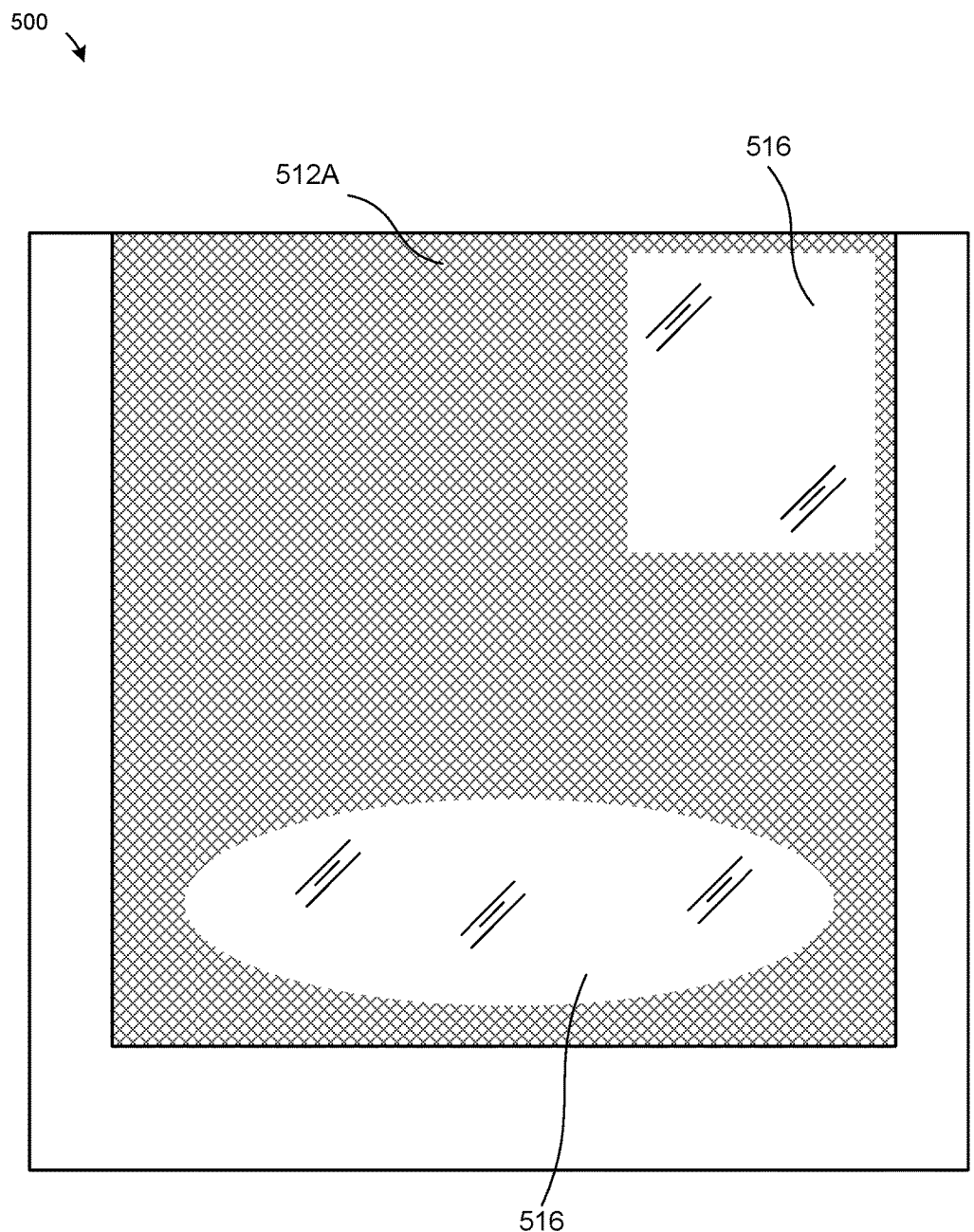
FIG. 5B is a cross-sectional top view of the cooking instrument of FIG. 5A along lines A-A', in accordance with various embodiments.
Figure 5C:
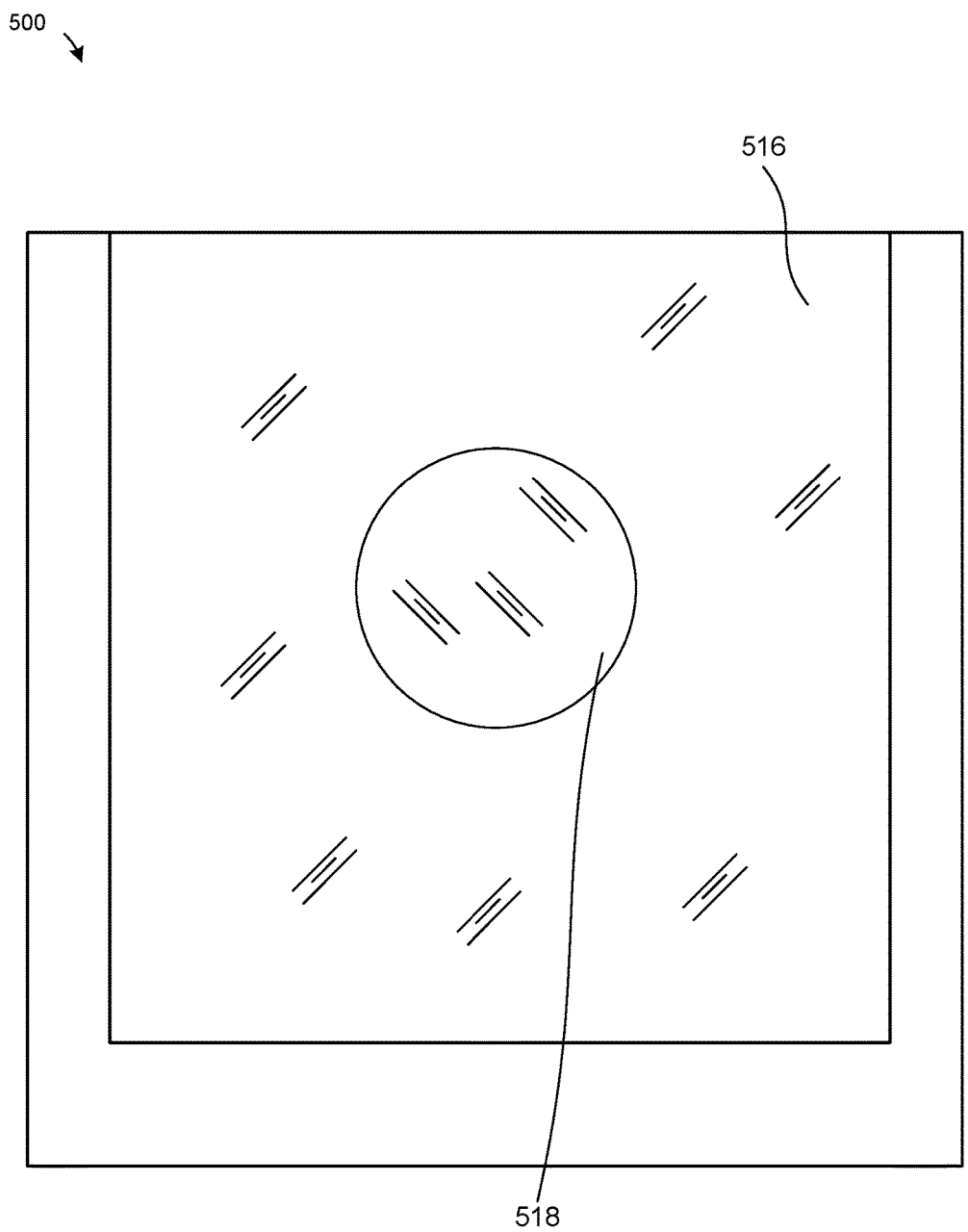
FIG. 5C is a cross-sectional top view of the cooking instrument of FIG. 5A along lines B-B', in accordance with various embodiments.
Figure 5D:
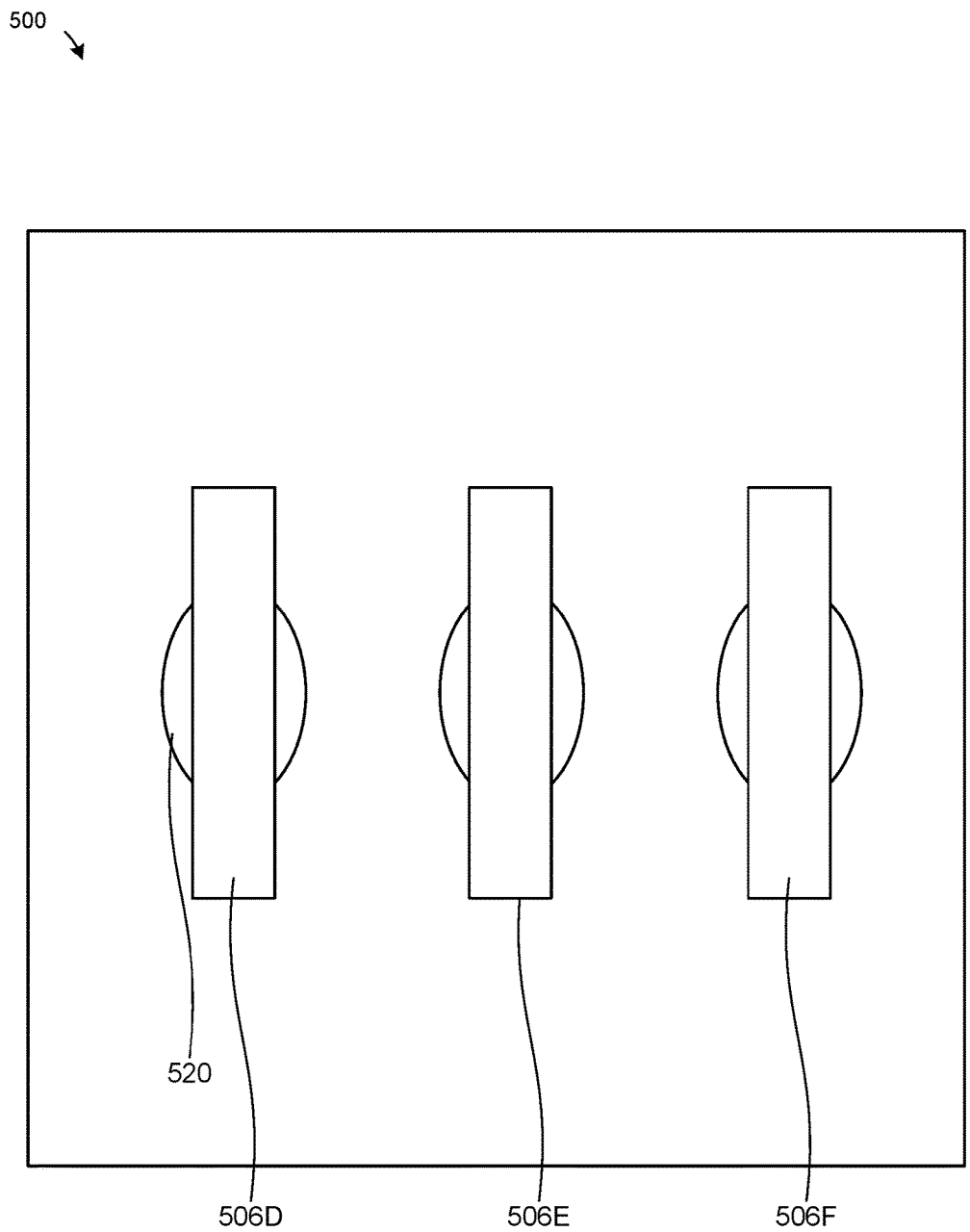
FIG. 5D is a cross-sectional top view of the cooking instrument of FIG. 5A along lines C-C', in accordance with various embodiments.

FIG. 5B is a cross-sectional top view of the cooking instrument 500 of FIG. 5A along lines A-A', in accordance with various embodiments. FIG. 5B can illustrate the perforated metal sheet 512A and cavities within the perforated metal sheet 512A that exposes the tray 516. FIG. 5C is a cross-sectional top view of the cooking instrument 500 of FIG. 5A along lines B-B', in accordance with various embodiments. FIG. 5C can illustrate the tray 516. FIG. 5D is a cross-sectional top view of the cooking instrument 500 of FIG. 5A along lines C-C', in accordance with various embodiments. FIG. 5D can illustrate the filament assemblies 506.

Figure 6:
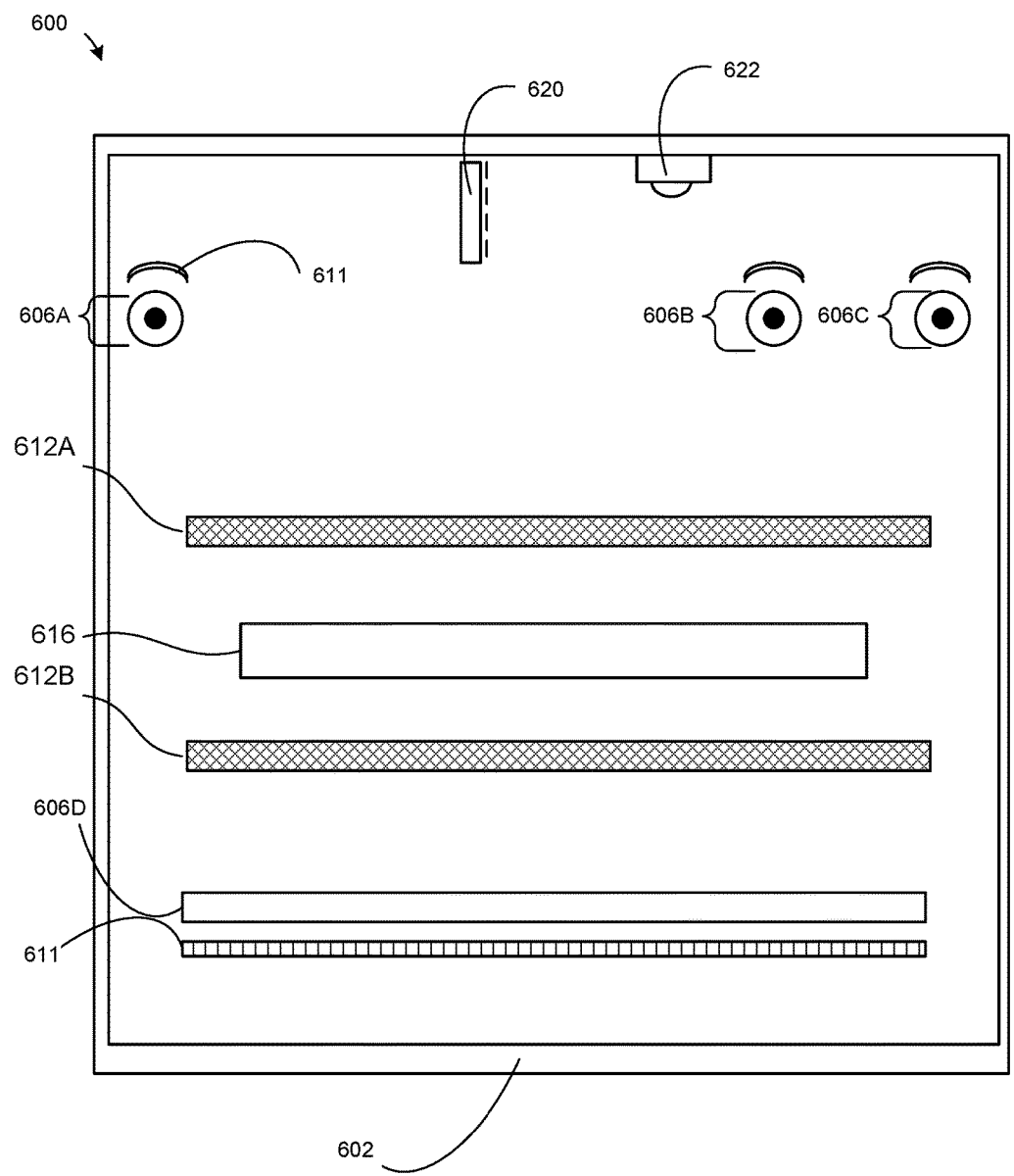
FIG. 6 is a cross-sectional front view of a second example of a cooking instrument, in accordance with various embodiments.

FIG. 6 is a cross-sectional front view of a second example of a cooking instrument 600, in accordance with various embodiments. This second example can illustrate various features in various embodiments of the disclosed cooking instrument. A particular feature, structure, or characteristic described in connection with the second example can be included in the first example. All of the described examples have features that are not mutually exclusive from other examples.

For example, the cooking instrument 600 includes heating elements, and therefore filament assemblies (e.g., a filament assembly 606A, a filament assembly 606B, a filament assembly 606C, and a filament assembly 606D, collectively as the "filament assemblies 606"). The filament assemblies 606 can differ from the filament assemblies 506 in that an upper set (e.g., the filament assemblies 606A, 606B, and 606B) extends longitudinally at a substantially perpendicular angle from a lower set (e.g., the filament assembly 606D and other filament assemblies not shown). Further unlike the filament assemblies 506, the filament assemblies 606 are not uniformly spaced apart from each other.

A reflector 611 can be positioned to be spaced apart from each of the filament assemblies 606. The reflector 611 can be a standalone structure unlike the coating of the reflector 511. The reflector 611 can be spaced within a distance from a filament assembly (e.g., therefore a heating element) to have anti-fouling characteristics and to vaporize any food debris. The cooking instrument 600 can include a fan 620. Unlike the cooling system 520, the fan 620 is not specifically directed to any of the filament assemblies 606.

A chamber 602 is substantially similar to the chamber 502. Perforated metal sheets 612A and 612B are substantially similar to the perforated metal sheets 512. A tray 616 is substantially similar to the tray 516, but does not include a reflective portion. The camera 622 is substantially similar to the camera 522.

Figure 7:
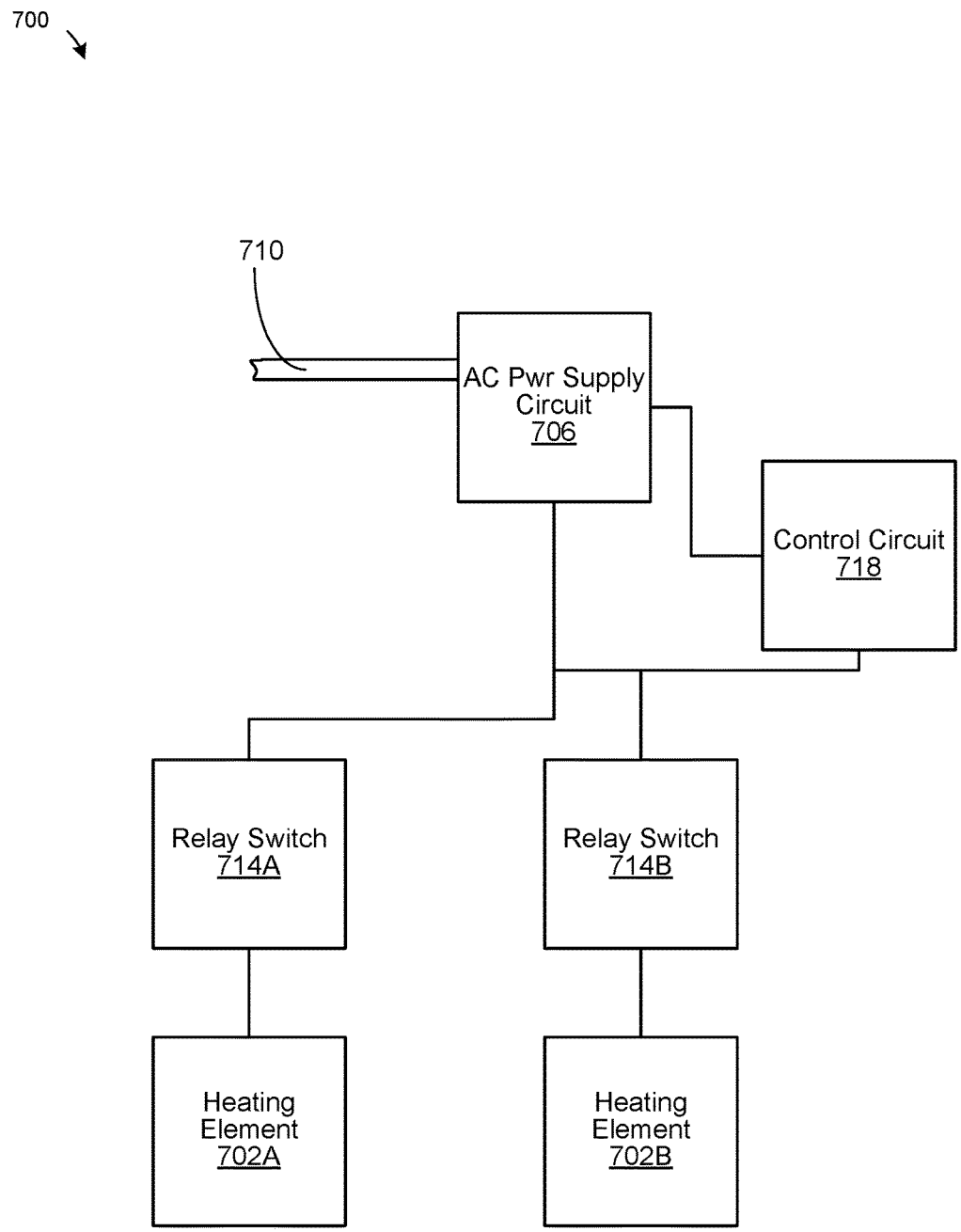
FIG. 7 is a circuit diagram of a heating system of a cooking instrument, in accordance with various embodiments.

FIG. 7 is a circuit diagram of a heating system 700 of a cooking instrument (e.g., the cooking instrument 100, the cooking instrument 200, and/or the cooking instrument 300), in accordance with various embodiments. The heating system 700 can include a plurality of heating elements (e.g., a heating element 702A, a heating element 702B, etc., collectively the "heating elements 702") configured to generate electromagnetic waves. Each heating element is configurable to operate over a range of peak wavelengths.

An alternating current (AC) power supply circuit 706 is configured to provide, pipe, and/or convert AC power from an AC power line 710 to direct current (DC) power. The AC power line 710 provides up to a maximum power threshold before triggering a circuit breaker. The AC power supply circuit 706 can include a power factor correction (PFC) circuit. The AC power supply circuit 706 can divide an AC power cycle from the AC power line into two half waves.

A plurality of relay switches (e.g., a relay switch 714A, a relay switch 714B, etc., collectively as the "relay switches 714") can respectively correspond to the plurality of heating elements 702. The relay switches 714 can be TRIAC switches. The DC power from the AC power supply circuit 706 is routed to a heating element when a corresponding relay switch is switched on. A control circuit 718 is configured to switch on a subset of the plurality of relay switches 714 such that a total power drawn through the relay switches is equal to or below the maximum power threshold. The control circuit 718 can be configured to switch on a single relay switch at a time to concentrate the DC power provided via the AC power supply at the maximum power threshold to a single heating element. The control circuit 718 can include a processor (e.g., the computing device 206). The relay switches 714 can be configured by the control circuit 718 to provide one half wave to a first heating element and another half wave to a second heating element.

Figure 8:
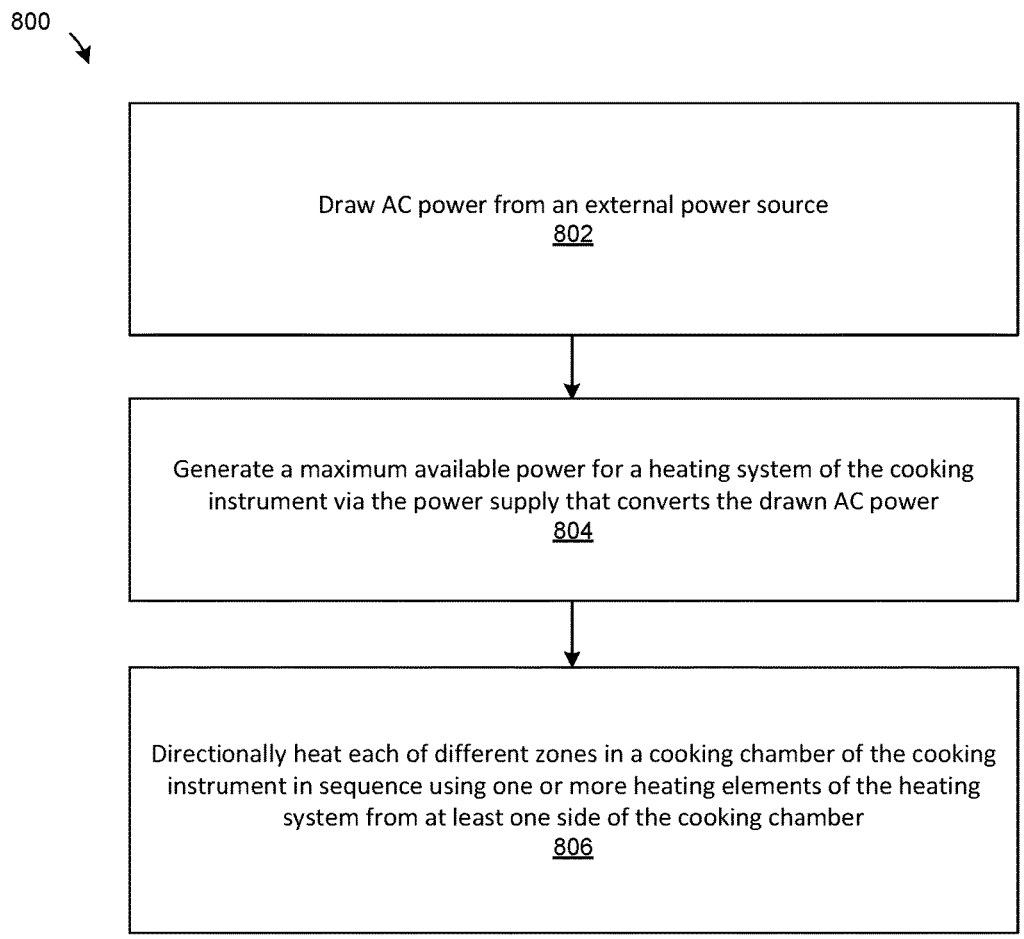
FIG. 8 is a flow chart illustrating a method of operating a cooking instrument, in accordance with various embodiments.

FIG. 8 is a flow chart illustrating a method 800 of operating a cooking instrument (e.g., the cooking instrument 100), in accordance with various embodiments. At step 802, the cooking instrument can draw alternating current (AC) power from an external power source (e.g., the AC power line 710, such as an AC utility grid) substantially at an expected maximum power draw limit (e.g., circuit breaker limit) of the external power source. The expected maximum power draw can be embodied in the implementation or configuration of a power component (e.g., the power source 202). For example, the cooking instrument can include an electronic component (e.g., a power relay, triac circuit, thyristor circuit, etc.), specifically selected, configured, or adapted to gate the incoming current from the external power source substantially at the expected maximum power draw limit.

At step 804, the cooking instrument can generate a maximum available power for a heating system (e.g., the heating elements 114) of the cooking instrument via the power component (e.g., the power source 202) that provides the drawn AC power. The maximum available power for the heating system is less than or equal to the expected maximum power draw limit from the external power source. For example, the maximum available power for the heating system is approximately the total power drawn (e.g., set at the expected maximum power draw limit) by the power component minus both power dissipation in the power component and power distributed to one or more other loads (e.g., a computing system, a camera, etc.) in the cooking instrument.

At step 806, the cooking instrument can directionally heat each of different zones in a cooking chamber (e.g., the chamber 102) of the cooking instrument in sequence using one or more heating elements (e.g., the heating elements 114) of the heating system from at least one side of the cooking chamber such that each step in the sequence utilizes the maximum available power for the heating system. For example, each step of the sequence includes heating directionally to a first zone for the same duration and/or same intensity as heating directionally to a second zone in another step in the sequence. In other examples, consecutive steps do not necessarily have the same duration or intensity. In some embodiments, during the sequence, a cooking platform holding food in the cooking chamber remains stationary. This advantageously ensures that each zone corresponds to an area of the target food.

Directionally heating, for example, can be achieved by emitting electromagnetic waves with a planar intensity distribution that is substantially uneven at a cooking platform surface and that is substantially parallel to the at least one side. In some cases, the different zones can be respectively targeted by different heating elements/filament assemblies (e.g., the heating elements 114 or the heating elements 218). These heating elements can be directional heating elements facing toward the different zones (e.g., areas above a support tray, such as the cooking platform 110 or the tray 516). In some cases, the different zones can be respectively targeted by a single directional heating element (e.g., by redirecting the emitted wireless power or by turning the single directional heating element mechanically).

In some examples, there are multiple heating elements in the heating system. The heating system can heat food using at least one of the heating elements. A heating element can emit wireless waves (e.g., electromagnetic energy). The cooking instrument can heat by alternatingly activating or rotating through different subsets of the heating elements on the at least one side of the cooking instrument. Each different subset can include at least a single heating element. In some cases, the cooking instrument can activate each different subset by at least configuring each different subset with the same spectral emission configuration. In some cases, the alternation of the subsets is cyclical (e.g., by repeating the sequence of the subsets).

The cooking instrument can control the spectral emission configuration of a heating element by specifying the spectral distribution of the emitted waves. In some embodiments, the cooking instrument targets the different zones using different spectral emission configurations. In some embodiments, the cooking instrument heats food by emitting electromagnetic waves with an emission spectrum configured to directly transfer heat to food in the cooking chamber. "Direct transfer" of heat can be accomplished by ensuring that a substantial peak emission wavelength of the emission spectrum corresponds to a resonant frequency of the food. Other types of heating includes heating a tray holding the food or heating the air and thus indirectly heating the food.

In one example, the heating elements include at least three heating elements spaced equally apart. In one example, each step of the sequence lasts at least a second in time. That is, the cooking instrument (e.g., via the computing device 206) is configured to drive each of the subsets at the same power level for a duration at 1 second or longer to transfer sufficient heat to cook food in the respective target zone of each subset.

Figure 9:
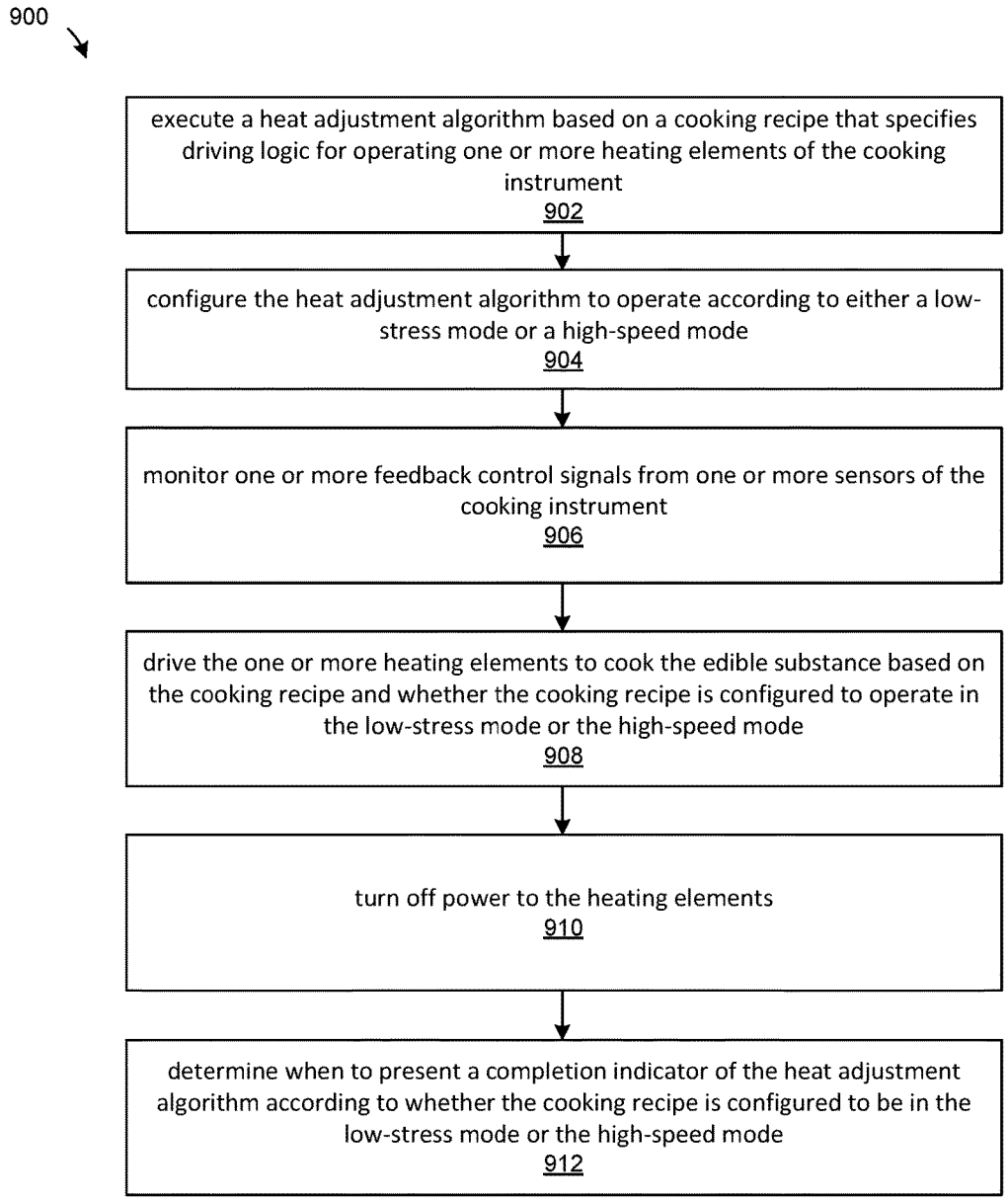
FIG. 9 is a flowchart illustrating a method of operating a cooking appliance to cook an edible substance in different modes, in accordance with various embodiments.

FIG. 9 is a flowchart illustrating a method 900 of operating a cooking appliance to cook an edible substance in different modes, in accordance with various embodiments. At step 902, a computing device of the cooking appliance can be configured to execute a heat adjustment algorithm/process based on a cooking recipe that specifies driving logic for operating one or more heating elements of the cooking appliance.

For example, the cooking recipe can specify which of the heating elements to turn on (e.g., controlling the directionality of heating). For example, the cooking recipe can dictate that heating elements from below a tray are turned on and heating elements from above the tray are turned off. In this example, the cooking appliance can be simulating a range top. The cooking appliance can heat up the edible substance in a number of ways. The cooking appliance can be configured to heat the edible substance directly. The cooking appliance can be configured to directly heat its internal chamber (e.g., its chamber walls and its tray) and let the blackbody-like emission from the walls of its internal chamber heat the edible substance. For clarity, the blackbody-like emission is not the reflection of the wireless waves emitted from the heating elements, rather it is the emission/radiation released from the walls being heated. The spectral distribution of the blackbody-like emission would be different from the spectral distribution of the reflected waves from the heating elements. The cooking appliance can be configured to heat the internal chamber and the edible substance simultaneously. The heated air in the internal chamber can also heat up the edible substance. The cooking appliance can further be configured to provide airflow of heated air to cook the food as an impingement convection oven. At a lower airflow speed, the cooking appliance can be configured as a regular convection oven.

Because items (e.g., the edible substance, the air, the chamber walls, and the tray) inside the cooking appliance may each have one or more excitable wavelengths, by controlling the peak emission wavelengths of the heating elements, the computing device can specifically target different items to heat up. Because an item can have multiple excitable wavelengths, the computing device can select different peak emission wavelengths to control the cooking speed/efficiency provided by the heating elements.

When initially heating up any cooking appliance to a proper operating temperature, such cooking appliance may attempt to draw too much power. Accordingly, the disclosed cooking appliance can include a choke circuit that caps the power drawn to be within the limit of typical circuit breakers. For example, typical circuit breakers can tolerate sudden large surges, but not a relatively consistent draw above 1800 Watt). The choke circuit can cause the cooking appliance to warm up slower initially to prevent blowing a fuse in a circuit breaker.

At step 904, the computing device can configure the heat adjustment algorithm to operate according to either a low-stress mode or a high speed mode. At step 906, the computing device can monitor one or more feedback control signals from one or more sensors of the cooking appliance. For example, the feedback control signals can include a temperature reading signal from a temperature probe, an optical feedback signal from an optical sensor (e.g., a camera), or a combination thereof.

At step 908, the computing device can drive the one or more heating elements to cook the edible substance based on the cooking recipe and whether the cooking recipe is configured to operate in the low-stress mode or the high speed mode. In some embodiments, the computing device can drive the one or more heating elements further based on the feedback control signals. In some embodiments, the computing device can calculate a projection (e.g., heating trajectory) of when to complete cooking and turn off the heating elements. In some embodiments, the control of the heating elements is dynamic (e.g., based on feedback control signals from the temperature probe or from the camera), and hence completion time is not yet known.

At step 910, the computing device can turn off power to the heating elements. At step 912, the computing device can determine when to present a completion indicator of the heat adjustment algorithm according to whether the cooking recipe is configured to be in the low-stress mode or the high speed mode. In some embodiments, the computing device can determine when to present the completion indicator based on the feedback control signals (e.g., when the searing is "visually" done according to an optical sensor or when the edible substance has reached a certain temperature for a certain period of time).

The high speed mode requires extraction of the edible substance from the cooking appliance when the completion indicator is presented (e.g., otherwise the edible substance will overcook). The low-stress mode allows for the extraction to occur within a preset time range (e.g., from immediately to within 30 minutes or from immediately to within two to three hours).

In some embodiments, under the high speed mode, the cooking appliance can present the completion indicator when the computing device turns off the power to the heating elements. In some embodiments, under the low-stress mode, the computing device can present the completion indicator a certain amount of time after the computing device turns off the power to the heating elements. For example, after the power to the heating elements is turned off, the tray and/or the chamber walls of the cooking appliance remain as blackbody-like emission sources. The internal air is also still at a high temperature. Under the low-stress mode, the computing device can simulate a blackbody emitter and the hot air using a computerized model to compute/predict the heating trajectory of the edible substance. The computing device can present the completion indicator once the heating trajectory has reached a point where the blackbody emission has died down sufficiently and the hot air has cooled such that they do not cause the edible substance to be overcooked or go stale even if the edible substance remains in the chamber for a preset range of time.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

The invention claimed is:

1. A method of cooking using a cooking instrument, comprising:
    drawing alternating current (AC) power from a power source substantially at an expected maximum power draw limit of the power source;
    generating, from the drawn AC power, a maximum available power for a heating system of the cooking instrument via a power component, wherein the maximum available power for the heating system is less than or equal to the expected maximum power draw limit from the power source; and
    heating directionally, from at least one side of the cooking chamber, each of two or more zones in a cooking chamber of the cooking instrument in sequence using one or more heating elements of the heating system such that each step in the sequence utilizes the maximum available power for the heating system to each corresponding zone.

2. The method of claim 1, wherein said heating includes alternating through each of two or more subsets of the one or more heating elements on the at least one side in sequence, each of the two or more subsets including at least a single heating element.

3. The method of claim 2, wherein activating each of the two or more subsets includes configuring such each subset with the same spectral emission configuration.

4. The method of claim 2, wherein said alternating is cyclical by repeating the sequence of said heating.

5. The method of claim 1, wherein said heating is by emitting electromagnetic waves with an emission spectrum configured to directly transfer heat to food in the cooking chamber.

6. The method of claim 1, wherein each step of the sequence includes heating directionally to a first zone for the same duration as heating directionally to a second zone in another step in the sequence.

7. The method of claim 1, wherein the heating elements include at least three heating elements spaced equally apart.

8. The method of claim 1, wherein each step of the sequence lasts at least a second in time.

9. The method of claim 1, wherein, during the sequence, a cooking platform holding food in the cooking chamber remains stationary.

10. A cooking instrument comprising:
    a cooking chamber;
    a power component adapted to draw from an external alternating current (AC) power source substantially at an expected maximum limit of the external AC power source and provide the drawn AC power to a maximum transferable power to an heating system, wherein the power component is adapted to gate incoming current from the external AC power source substantially at the expected maximum limit and wherein the expected maximum limit corresponds to an expected power limit before triggering a circuit breaker;
    the heating system configured to emit waves that directly transfer heat to food, the heating system comprising:
    multiple heating elements on a side of the cooking chamber; and
    one or more heat element drivers for the multiple heating elements; and
    a control system configured to drive subsets of the multiple heating elements in sequence, wherein, in each step of the sequence, the control system is configured to drive each subset utilizing the maximum transferable power.

11. The cooking instrument of claim 10, wherein each of the subsets has at least a single heating element and the heating system is an infrared-based heating system.

12. The cooking instrument of claim 10, wherein the power component is configured with a feedback loop to prevent drawing more than the maximum limit.

13. The cooking instrument of claim 10, wherein the control system is configured to utilize a feedback control loop to achieve even heating of at least one side of food in the cooking chamber after completion of the sequence.

14. The cooking instrument of claim 13, wherein the control system is configured to monitor power consumption of the heating system as an input to the feedback control loop.

15. The cooking instrument of claim 13, further comprising an image sensor, wherein the control system is configured to analyze an image from the image sensor to produce an input to the feedback control loop.

16. The cooking instrument of claim 13, further comprising a temperature sensor configured to monitor a temperature of the food, wherein the control system is configured to utilize the temperature as an input to the feedback control loop.

17. The cooking instrument of claim 10, wherein the subsets have at least one different heating element from one another.

18. The cooking instrument of claim 10, wherein the control system is configured to reduce said heating between sequential steps in the sequence for a predetermined constant duration.

19. The cooking instrument of claim 10, further comprising at least one sensor; wherein the control system is configured to dynamically adjust duration or intensity of a step in the sequence based on an input of the at least one sensor.

20. The cooking instrument of claim 10, wherein each of the one or more heat element drivers corresponds to a single one of the multiple heating elements.

21. The cooking instrument of claim 10, wherein each of the one or more heat element drivers corresponds to more than one of the multiple heating elements.

22. A cooking instrument comprising:
a heating system comprising:
multiple heating elements; and
at least one heating element driver;
a power component capable of providing power to a heating system up to a maximum limit; and
a controller configured to select a heating sequence to operate the heating system; and
wherein the controller is configured to operate the at least one heating element driver to, at a given step of the heating sequence, converge the power provided by the power component at the maximum limit to only a first subset of the multiple heating elements and, at a subsequent step of the heating sequence, to converge the power provided by the power component to a second subset of the multiple heating elements that is different from the first subset.

23. The cooking instrument of claim 22, further comprising an input interface and a cooking chamber, wherein the at least one heating element driver is configured by the controller to heat, according to a digital recipe received via the input interface, food in the cooking chamber.

* * * * *